United States Patent Office 2,737,762
Patented Mar. 13, 1956

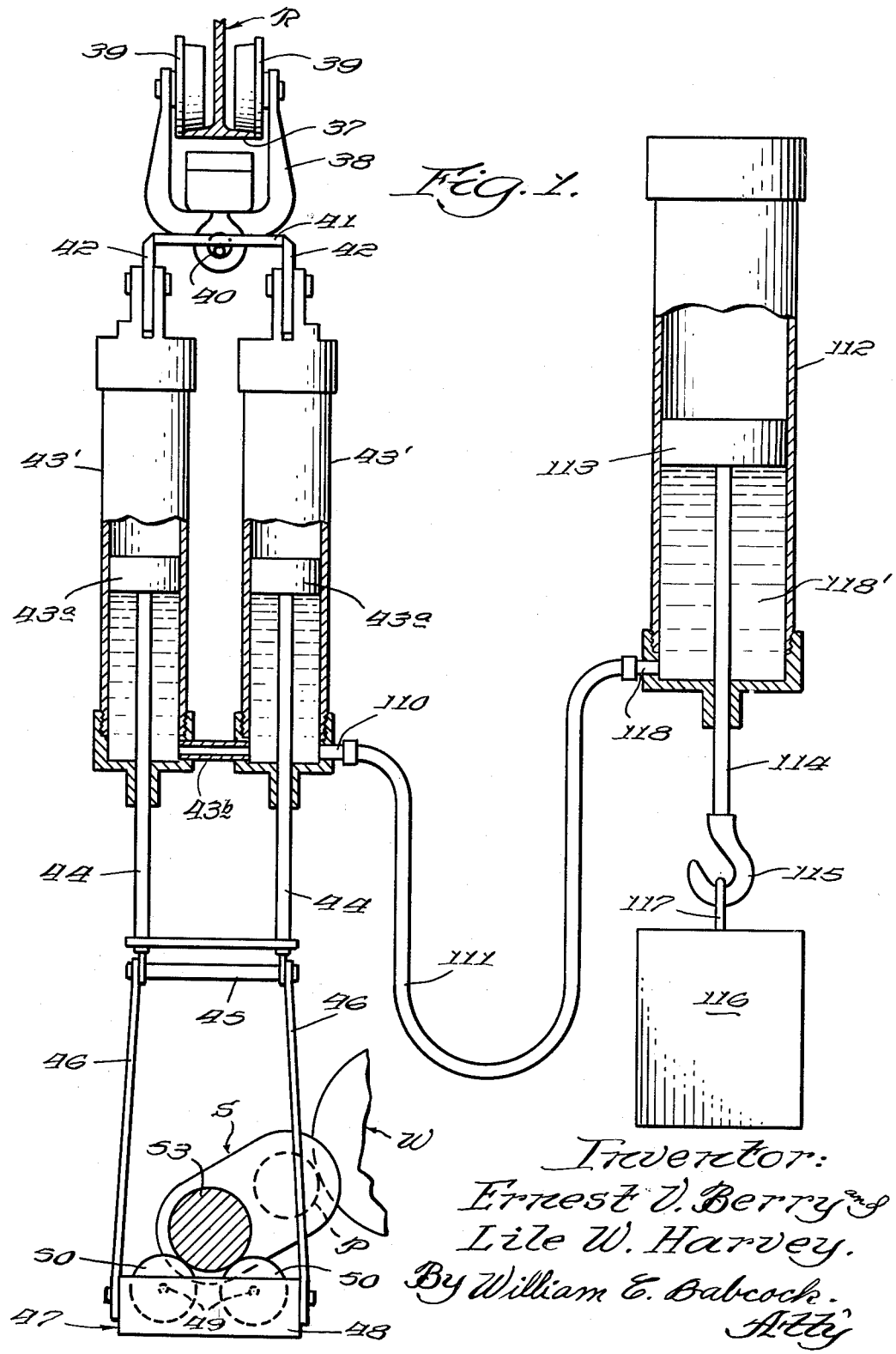

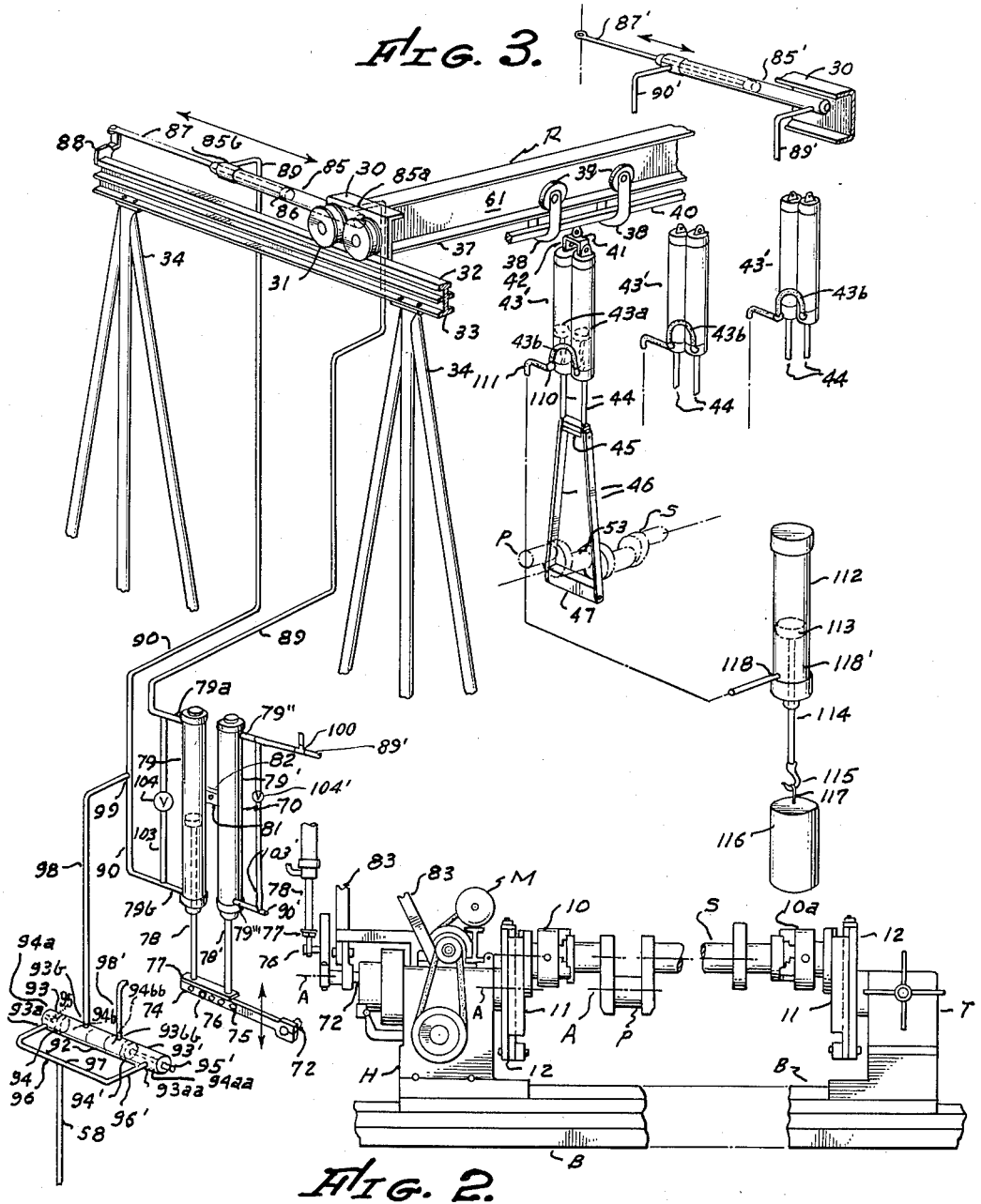

2,737,762

APPARATUS AND METHOD FOR SUPPORTING A DEFORMABLE MEMBER

Ernest V. Berry and Lile W. Harvey, Los Angeles, Calif.; said Harvey assignor to said Berry Application August 28, 1953, Serial No. 377,036

14 Claims. (Cl. 51—237)

The present application is a continuation-in-part of our pending application, Serial No. 354,318, entitled Apparatus and Method for Supporting a Deformable Member, and Product Formed by Said Method, filed May 11, 1953.

The present application relates to additional improvements made in the general field of work-supporting devices not specifically disclosed in the drawings filed with our co-pending application, Serial No. 354,318. Like the parent case, this application is directed particularly to an apparatus for maintaining an elongate member, such as a crankshaft or the like, in a rotatably balanced, non-distorted position to permit accurate machining of parts thereof; the method of so supporting an elongate member; and an article of manufacture, including surfaces thereof, formed by means of said method.

One problem frequently encountered in the maintenance of mechanical equipment is that of reconditioning the worn crank pins and main journals of crankshafts. Although it has long been recognized that considerable financial savings could be achieved by the satisfactory reconditioning of large crankshafts such as used in Diesel locomotives, no reliable method or apparatus for accomplishing this work has previously been available.

The chief disadvantages of previously available apparatus for the reconditioning of heavy crankshafts have been the very high initial cost thereof, and the massive, cumbersome structure of such apparatus in order for it to support the full weight of a crankshaft disposed between the throwheads thereof, as well as that of the counterweights employed with the throwheads during the machining of the crankshafts.

A further disadvantage of previously available apparatus of this nature has been the great difficulty encountered in maintaining a crankshaft in balance and in a non-distorted position during rotation, even with the assistance of heavy counterweights carefully adjusted on the throwheads.

A primary object of our present invention is to furnish apparatus of simpler construction than that shown in our pending application, Serial No. 354,318, and one that does not require a series of relatively large air reservoirs, as well as the precision pressure reducing valves used in conjunction therewith forming a part of the previously disclosed invention.

A major object in devising the apparatus and method of our invention is to furnish means for maintaining elongate members in a rotatably balanced, non-distorted horizontally disposed position by placing work supports at selected positions along the length thereof, urging each of said supports upwardly with a force sufficient to float said member in mid-air, and rotating the ends of said member by means not supporting the weight of said member.

Another object of our invention is to provide an apparatus of simplified mechanical structure that may be relatively light in weight inasmuch as the tail stock and head stock thereof do not support the member on which work is being performed, but merely serve to rotate the ends of the member through a predetermined annular path.

A further object of our invention is to provide an apparatus embodying work supports which are laterally reciprocated with the desired throw in synchronism with the rotation of the member being machined, whereby a substantially vertical, upwardly directed force is constantly maintained on the supports.

Yet another object of our invention is to provide an apparatus in which the work supports may be individually urged upwardly at the desired force by the combined action of weights and hydraulic means whereby an elongate member may be maintained in a horizontally disposed, rotatably balanced, non-deformed position.

Still another object of our invention is to supply an apparatus and method which is simple to use, is readily adjustable to the length and weight of a particular elongate member with a minimum of time and physical effort, and one adapted to be operated by an ordinary mechanic having little or no special training.

A still further object of our invention is to provide an apparatus that may be fabricated from standard commercially available materials, is relatively light in weight, occupies a minimum of floor space, is portable, does not require the installation of special footings or foundations for its support, and is not adversely affected by vibration to which it might be subject if the apparatus were installed near railroad tracks.

Yet another object of the invention is to provide vertically and laterally movable supports adapted to be so arranged that sufficient portions of the main journals of a rotatably balanced crankshaft may be rotatably engaged by the supports whereby the crankshaft is literally floated in the air in a horizontal position with substantially the entire weight thereof borne by said supports.

These and other objects and advantages of our invention will become apparent from the following description of a preferred form thereof, and from the drawing illustrating that form in which:

Figure 1 is a combined vertical cross-sectional and elevational view of our work support for an elongate deformable member;

Figure 2 is a side elevational view of a grinder showing a crankshaft rotatably supported therein; and Figure 3 is a perspective diagrammatic view of the work support and auxiliary apparatus used therewith.

The general arrangement of our invention is shown in Figure 1 of our pending application, Serial No. 354,318, and only that portion thereof is shown in the drawing of the present application relating to our new apparatus and method of actuating the individual work supports. For clarity herein, the same identifying numerals and letters are used in the present application as employed in the parent application with regard to those elements common to both inventions.

Our present invention, like that disclosed in application Serial No. 354,318, is adapted to be utilized in the grinding of crank pins P on a crankshaft S to the desired transverse diameter. However, as will hereinafter become apparent, our invention is by no means limited to simply supporting a crankshaft in a horizontally disposed, rotatably balanced, non-distorted position, but it may be used equally well in the support of other heavy elongate members such as calender rolls to permit machining thereof. It should also be noted that a crankshaft S, or other elongate member to be worked, may be either new or used.

We have found it desirable to employ our work-supporting apparatus and method in conjunction with a grinder such as the device manufactured and sold by the Van Norman Company of Springfield, Massachusetts. For the purpose of clarification herein, these devices are identified as the Van Norman Company Crankshaft Regrinders, Model No. 111, No. 111–EL24, and No. 111–EL30.

The Van Norman grinder is shown in detail in Figure 1 of our application Serial No. 354,318, as well as in Figure 2 of the drawings accompanying the present application. The grinder includes an elongate bed B on which a tail stock T and head stock H are slidably mounted for relative longitudinal adjustment thereof whereby chucks 10 and 10a may be caused to removably engage and support the ends of a crankshaft S. A power driven grinding wheel W, shown in Figure 1, forms a part of said Van Norman re-grinder and is employed in forming desired portions of a work piece supported between said chucks to a true cylindrical surface. It will, of course, be apparent that, in order for wheel W to grind a true cylindrical surface, that portion of the work piece being ground must rotate about an axis A, which if projected would extend through the center of rotation of two heavy rectangular members 12 that, by means of a tongue and groove or like construction, adjustably support members 11 on which the chucks 10 and 10a are situated.

To grind a cylindrical surface on the crank pins P of crankshaft S, the chuck-supporting members 11 are adjusted on members 12 to displace the centers of the chucks one-half the throw of the crankshaft from the axis of rotation A. Thus, a pin P would theoretically rotate about axis A, but in practice, due to the weight thereof, a large crankshaft deforms or sags downwardly and the actual pin axis of rotation is thereby angular to the theoretical axis of rotation. Inasmuch as the grinding face of wheel W is disposed in a true horizontal plane, it will be obvious that a true cyindrical surface cannot be formed on pin P when the pin rotates about an axis angular to axis A.

Displacement of pin P, as above mentioned, is completely avoided by means of the present invention, in which a number of horizontal supports 47 bearing suitable rotatable means are placed in contact with a portion of the main journals of crankshaft S, and then subjecting the supports to independently regulated upward forces sufficient to permit axis A to pass through the center of rotation of members 12. If a crankshaft S is of a rotatably balanced design, it may thus literally be floated in the air at a desired elevation, in a non-deformed position when so mounted on supports 47.

The term "throw" as used herein is defined to be twice the radius of the crank pin on a crankshaft. A movable carriage is mounted on the grinder bed which supports a transversely disposed power driven grinder wheel W.

It will be apparent that our apparatus operates in direct contrast to any former apparatus employed in this field. In using prior apparatus it has been the practice to horizontally support a long, heavy crankshaft S in an off-center position between the throwheads of a head stock and a tail stock. The throwheads are drastically unbalanced when thus supporting a crankshaft, and heavy counterweights must be mounted thereon in an attempt to bring them and the supported crankshaft into rotational balance. In addition, due to its own weight, the crankshaft deforms downwardly, causing the longitudinal axis of the crank pins to assume angular positions rather than remaining in a fixed position. When such a situation prevails, it is practically impossible to grind the crank pins to a true cylindrical configuration.

The apparatus of our invention which permits grinding of true cylindrical crank pins and main journals, includes an elongate supporting rail R horizontally disposed above the head stock and tail stock of the grinder. Rail R may take various forms, but we have found it convenient to employ a heavy I-beam that does not deflect appreciably when supporting the heaviest of crankshafts adapted to be machined by the particular grinder assembly associated therewith. The rail R is movably supported for transverse reciprocating motion, synchronized with the rotation of crankshafts as hereinafter explained in detail.

The I-beam constituting rail R has a flange 37 extending along the lower portion thereof as shown in Fig. 3. A number of U-shaped hangers 38 are provided, each of which rotatably supports two opposed rollers 39 from the upper portions thereof, which rollers movably engage the upper surfaces of flange 37. Hangers 38 may be maintained in the desired spacing on rail R by means of a longitudinally extending rod 40 affixed to each hanger.

Groups of pairs of hydraulic cylinders 43' are vertically disposed and longitudinally spaced under rail R in the same manner as the air cylinders 43 as disclosed in pending application, Serial No. 354,318. The two cylinders 43' comprising each pair are laterally spaced from one another, with the upper end portion of each cylinder being connected to a vertically disposed leg 42. Each pair of legs 42 is rigidly affixed to a transversely disposed cross piece 41 connected to rod 40. Pistons 43a are slidably mounted in the interior of cylinders 43' and are rigidly connected to the upper end portions of piston rods 44. The piston rods project downwardly through suitable packing means formed in the lower portions of cylinders 43', and the lower portions of rods 44 supports a horizontally disposed rod 45. Each rod 45 pivotally supports two downwardly and outwardly extending connecting members 46, each pair of which serves to hold one of the previously mentioned work supports 47 in a horizontal transverse position between the lower end portions thereof.

Each support 47 embodies a rectangular frame 48 in which two transverse, longitudinally spaced shafts 49 are mounted, and each shaft rotatably supports a pair of rollers 50. The rollers 50, as may be seen in Figure 1 herein, are adapted to rotatably engage the lower surface of a main crankshaft journal 53, or such other cylindrical body supported thereby. The lower interior portions of each pair of adjoining cylinders 43' are connected by a tubular member 43b. One of each pair of cylinders 43' has a nipple 110 projecting from the lower end thereof with a flexible tube 111 connected thereto. Tube 111 serves to conduct hydraulic fluid under predetermined pressure to the interior of cylinders 43'. By application of fluid under pressure to one pair of cylinders, a particular support 47 may be urged upwardly with the desired force, which force is transmitted to journal 53 through rollers 50 in rolling contact with the lower surface thereof as shown in Fig. 1.

It will be apparent that for the crankshaft S to be maintained in a non-distorted, rotatably balanced position when supported as shown in Figure 1 of pending application Serial No. 354,318, supports 47 must at all times be urged upwardly with constant force of such magnitude as to float the rotating crankshaft in mid-air in a non-deformed condition. The deforming counter forces to which the crankshaft is subject and which are overcome by the upward force provided by supports 47, include the weight of the shaft itself, as well as the centrifugal forces generated during rotation of the crankshaft. To urge each of the supports 47 upwardly with a force that will literally float the crankshaft in mid-air without distortion as it rotates, each support 47 in addition to the paired cylinders 43', is provided with a second vertically disposed hydraulic cylinder 112. Although in practice it is preferable to use a pair of cylinders 43' for actuating each work support 47, the same result may be achieved by use of a larger single cylinder should this be desirable from the standpoint of economy, design, or maintenance.

Cylinder 112, which has a piston 113 slidably movable therein, may be vertically disposed in an elevated position at any convenient location near the grinder. A piston rod 114 extends downwardly from piston 113 through suitable packing means formed in the lower portion of the cylinder. A hook 115 is mounted on the lower end of each piston rod 114. A number of varying weights 116 each having an eye 117 or other means for removably engaging hooks 115 are provided. Tube 111 is connected to a fluid outlet 118 formed in the lower portion of cylinder 112.

Hydraulic cylinders 43', conduit 111 and hydraulic cylinder 112 constitute a closed system in which the fluid 118' therein is at all times subjected to a constant pressure. The constant pressure per square inch on the fluid is, of course, calculated by dividing the particular weight 116 utilized by the cross-sectional area of the piston 113, minus the cross section of the piston rod 114.

The special advantage of our present invention resides in the fact that pistons 43a are at all times subjected to the same force whether they are moving upwardly or downwardly. In the form of our invention disclosed in application Serial No. 354,318, pistons 43a tend to move upwardly by compressed air, the quantity of which is of fixed volume for reasons other than movement of the pistons. Thus, as pistons 43a move upwardly, the volume of compressed air increases and the pressure per square inch on the pistons decreases. To compensate for this variation in air pressure, the fixed volume thereof is made so large that the variation caused by movement of the pistons does not appreciably affect the upward force exerted on supports 47.

Theoretically the weights 116 employed in our present invention should acquire certain kinetic energy as they move downwardly which would be manifest in increased pressure exerted on fluid 118' as the piston 113 reaches its lowest point and starts upwardly. Actually, the crankshafts S is rotated at a sufficiently low rate of speed that the kinetic energy acquired by weights 116 is of minor importance, and would not cause enough variation in pressure on fluid 118' to deflect supports 47 either upwardly or downwardly a distance greater than the tolerance at which the crank pin P is being ground. In the present form of our invention the rail R is reciprocated in synchronism with the rotation of crankshaft S by use of the equipment shown in Figure 3.

The rail R has two transversely disposed end pieces 30 mounted thereon, each of which is provided with two spaced grooved rollers 31. Rollers 31 support end pieces 30 and rail R for transverse reciprocal movement thereof relative to axis A by traveling on two horizontal tracks 32. Tracks 32 are mounted on cross pieces 33 which in turn are supported at the desired elevation by standards 34 resting on the floor.

Synchronized movement of rail R to at all times maintain it in the same vertical plane as that of axis A during grinding of pins P is achieved by providing a rotatable horizontal shaft 72 on headstock H which is rotated by a motor M in timed sequence with member 12.

An arm 74 is vertically mounted on shaft 72, which arm has a number of longitudinally spaced openings 75 formed therein, any one of which is adapted to removably receive a pin 76.

When a pin 76 is disposed in one of the bores 75, it pivotally engages a cross bar 77 rigidly connected to the lower ends of two parallel piston rods 78 and 78'. These two piston rods extend upwardly into two hydraulic cylinders 79 and 79' and are connected to pistons slidably mounted within the confines thereof. Cylinders 79 and 79' are held in fixed parallel relationship with one another by a centrally disposed cross member 81. Member 81 is pivotally supported on a pin 82 horizontally mounted on the upper portion of a frame 83. Frame 83, which may be in any one of a number of forms, extends upwardly above the headstock H and is preferably affixed to the upper portion thereof.

The hydraulic assembly 70 shown in Fig. 3 reciprocates the rail R. In using assembly 70 for this purpose, pin 76 is positioned in the appropriate bore 75 whereby the pistons affixed to the piston rods 78 and 78' reciprocate in the cylinders 79 and 79' respectively. Piston rods 78 and 78' are normally moved with the same vertical throw as that of the crank pins P.

It will be seen that the end portion of rail R above headstock H is provided with a horizontally disposed hydraulic cylinder 85, and a piston 86 slidably mounted therein is connected to a piston rod 87. The extreme outer end of piston rod 87 is connected to a lug 88 extending upwardly from one of the rails 32, and cylinder 85 is rigidly affixed to the end piece 30 positioned above headstock H.

Fluid connections 79a and 79b are provided at the upper and lower extremities of cylinder 79, and cylinder 85 has fluid connections 85a and 85b at the end portions thereof. A tubular member 89 extends between connections 79a and 85a, and another tubular member 90 maintains fluid communication between connections 79b and 85b. Rotation of arm 74 causes discharge of hydraulic fluid into cylinder 85, first through connection 85a and then through connection 85b, with resultant reciprocation of the cylinder and rail R relative to piston 86.

Lateral reciprocation of rail R is best accomplished by imparting this motion to both ends thereof. For this purpose fluid connections 79'' and 79''' are likewise provided for cylinder 79', from which connections tubular members 89' and 90', respectively, extend to a hydraulic cylinder 85% identical in construction to cylinder 85. Cylinder 85' and piston rod 87' associated therewith are mounted on end piece 30 disposed above tailstock T. When supplied with hydraulic fluid from cylinder 79', cylinder 85' and piston rod 87' serve to concurrently move the end piece 30 above tailstock T with movement of end piece 30 above headstock H. Hydraulic cylinders 79' and 85', and tubular members 89' and 90' constitute a closed hydraulic system completely filled with fluid.

As rail R reciprocates laterally in synchronism with rotation of the crankshaft S due to movement of hydraulic fluid in the two previously described closed systems, it is essential that the elements comprising these systems be completely filled with fluid at all times to avoid waste motion and preclude the possibility of rail R and crankshaft S getting out of phase. To achieve this end, an air-actuated device is provided which includes an intermediately positioned tubular member 92 from the ends of which two axially aligned cylinders 93 and 93' extend. Cylinders 93 and 93' are identical in structure, and pistons 94 and 94' respectively are slidably mounted within the confines thereof, which pistons are provided with piston rods 95 and 95' that serve to slidably maintain them in cylinders 93 and 93'.

As shown in Figure 3, pistons 94 and 94' define compartments 94a, 94b, and 94aa and 94bb in cylinders 93 and 93', respectively, which compartments vary in cubic content as the positions of the pistons change in the cylinders. The outer extremities of cylinders 93 and 93' have air inlets 93a and 93aa respectively formed therein, which inlets are connected by tubular members 96 and 96' extending to a tubular T 97, or other suitable fitting connected to air header 58. Inasmuch as the header 58 at all times supplies air under pressure, pistons 94 and 94' are constantly urged inwardly toward one another with a force proportionate to such pressure, which tends to reduce the volume in compartments 94b and 94bb.

The inwardly disposed extremities of cylinders 93 and 93' have bores 93b and 93bb formed therein through which hydraulic fluid may flow. A tubular member 98 extends from bore 93b to a T connection 99 in tubular member 90, and bore 93bb is likewise connected by a tubular member 98' which extends to a T connection 100 in tubular member 89'.

By use of the above described device shown in Figure 3, the first closed hydraulic circuit including cylinders 79, 85 and tubular members 89 and 90, as well as the second circuit comprising cylinders 79', 85' and tubular members 89' and 90', are at all times completely filled with hydraulic fluid. In both the first and second hydraulic circuits the hydraulic fluid is maintained at a predetermined constant pressure in direct ratio to the air pressure in compartments 94a and 94aa. It will be seen that hydraulic fluid may be by-passed between the lower and upper ends of each of the cylinders 79 and 79' through tubular members 103 and 103', respectively, which members are provided with valves 104 and 104', respectively.

The use of our invention is extremely simple. Headstock H and tailstock T are longitudinally adjusted on bed B in order that the crankshaft S may have the ends thereof engaged by the chucks 10 and 10a. When the crank pins are to be ground, members 11 are adjusted relative to members 12 whereby the centers of chucks 10 and 10a, as well as the longitudinal axis of the crankshaft end portions, are disposed from the center of rotation of members 12 by a distance equal to one-half the throw of crank pins P.

Rollers 39 are moved along rail R to position the work supports 47 under the main journals 53 of the crankshaft. Each of the supports 47 is then urged upwardly by means of fluid 118' under pressure, as previously described, to float the crankshaft in mid-air, whereby substantially the entire weight of the crankshaft is borne by the work supports. Chucks 10 and 10a merely serve as guides to rotate the ends of crankshaft S through the desired annular path, and are not relied upon to support the crankshaft. The proper upward force required on any one work support 47 is simply and easily achieved by adjusting the particular weight 116 associated therewith.

It is, of course, highly desirable that rail R laterally reciprocate such equal distances on each side of the longitudinal centerline of crankshaft S that supports 47 may be urged upwardly in a uniform direction at all times. To this end the vertical centerline of rail R is first disposed in the same vertical plane as that passing through the centers of rotation of members 12. Lateral movement of rail R to this position may be easily made when the by-pass valves 104 and 104' are placed in the open position.

At this point the invention is ready for operation. The manner in which the air and hydraulic systems shown in Figure 3 maintain the work supports 47 in positions whereby crankshaft S is at all times rotatably supported in a non-deformed condition has previously been described in detail and need not be repeated.

The invention is not restricted to the grinding of crank pins but may be utilized equally well in grinding main journals of a crankshaft. When the main journals of crankshaft S are ground, the crankshaft is maintained in a rotatably balanced, non-deformed position as supports 47 engage all of the main journals except those on which the grinding operation is being performed. Obviously, when the main journals are being ground, chucks 10 and 10a are not off-set from the center of rotation of members 11 and 12, nor is rail R laterally reciprocated. In addition to using the invention for grinding main journals, it may also be employed in grinding such heavy elongate members as calender rolls to a true cylindrical shape.

Although the form of our invention herein shown and described is fully capable of achieving the objects and providing the advantages hereinbefore mentioned, it is to be understood that it is merely illustrative of the presently preferred embodiment thereof, and that we do not mean to be limited to the details of construction and operation thereof other than as defined by the appended claims.

We claim:

1. A device for maintaining a deformable elongate member in a horizontal rotatably balanced non-deformed position which comprises: a horizontally disposed track situated above said member and parallel thereto; a support that rotatably engages the under side of said member; a substantially vertically disposed first hydraulic cylinder situated above said member; a piston slidably movable in said cylinder and connected to said support; tubular means for introducing fluid under pressure into said cylinder below said piston and exert an upward force on said support of such magnitude that substantially the entire weight of said member is borne thereby; a second hydraulic cylinder in communication with said tubular means; movable means in said second cylinder that at all times exert a force of substantially constant intensity on said fluid to supply said fluid to said first cylinder at said required pressure; roller means mounted on said track which support said cylinder and permit said support to rotatably engage said member at the desired longitudinal position thereon; means that movably support said track for lateral movement relative to said member; and means for laterally reciprocating said track in synchronism with the rotation of said member to at all times maintain said cylinder in a substantially vertical plane.

2. A device for maintaining the crank pins of a deformable crankshaft on a horizontally disposed longitudinal axis during the machining thereof which includes: means for eccentrically rotating the ends of said crankshaft when said crankshaft is horizontally disposed on a radius of rotation that is one-half the throw of the crank pins of said crankshaft; a horizontally disposed rail situated above said rotatably supported crankshaft; roller means that may move longitudinally on said rail; means that movably support said rail for lateral movement relative to said rotatably supported crankshaft; a vertically disposed first cylinder supported from said roller means; a piston slidably movable in said cylinder; a support which rotatably engages one of the main journals of said crankshaft; means connecting said support to said piston; tubular means through which fluid under pressure may be introduced into said cylinder to cause an upward force to be exerted on said support when engaging said main journal; a second cylinder in communication with said tubular means; a piston movably mounted inside said second cylinder capable of exerting pressure on fluid situated therein; weight means to control the pressure said piston in said second cylinder exerts on said fluid in said cylinders to permit a force of sufficient magnitude to be exerted upwardly on said support that said crankshaft will not deform when horizontally disposed and rotated; and means actuated by the rotation of said crankshaft that laterally reciprocate said rail and at all times maintain said connecting means of said support in a substantially vertical plane whereby said support is urged upwardly in a uniform direction.

3. A supporting device for maintaining a deformable crankshaft in a rotatably balanced, non-deformed position whereby the crank pins thereof may be ground which includes: guide means that eccentrically rotate the ends of said crankshaft when said crankshaft is horizontally disposed on a radius of rotation that is one-half the throw of the crank pins on said crankshaft; longitudinally and laterally movable means disposed above said crankshaft; a support for rotatably engaging one of the main bearings of said crankshaft; a vertically disposed first cylinder supported from said movable means; a piston slidably movable in said cylinder; means connecting said support to said piston; tubular means for introducing fluid under pressure into said cylinder to cause an upward force to be exerted on said support when engaging said main bearing; a second cylinder in communication with said first cylinder; means in said second cylinder for exerting and controlling the pressure on said fluid in said second cylinder to permit a force of sufficient magnitude to be exerted upwardly on said support that substantially the entire weight of said crankshaft may be borne by said support; and hydraulic means actuated by power-driven means which are synchronized with the rotation of said crankshaft to laterally reciprocate said longitudinally movable means to at all times maintain a vertical upwardly directed force on said support.

4. A supporting device for maintaining a deformable crankshaft in a rotatably balanced position with the crank pins thereof maintained in fixed vertical and horizontal planes which includes: guide means that eccentrically rotate the ends of said crankshaft when it is horizontally disposed through an off-centered annular path that has a radius of rotation one-half the throw of the crank pins of said crankshaft; longitudinally and laterally movable means above said crankshaft; a support for rotatably engaging one of the main journals of said crankshaft; a vertically movable member to which said support is connected; a first hydraulic cylinder operatively associated with said member, said cylinder being supported in a vertical position from said movable means, and said cylinder when supplied with fluid under pressure causing said member to be forcibly urged upwardly; tubular means for constantly supplying fluid at the required pressure to said cylinder to cause said support to be urged upwardly with a force of sufficient magnitude that said support bears substantially the entire weight of said crankshaft; a second hydraulic cylinder in communication with said tubular means; a piston movably mounted in said second cylinder; a weight removably connected to said piston in said second cylinder, said weight being of such magnitude that said piston in said second cylinder exerts said required pressure on said fluid; and means for laterally reciprocating said longitudinally movable means in synchronism with the rotation of said crankshaft to at all times urge said support upwardly in a substantially vertical direction.

5. A supporting device for maintaining a deformable crankshaft in a rotatably balanced position with the crank pins thereof maintained in fixed vertical and horizontal planes which includes: guide means that eccentrically rotate the ends of said crankshaft when it is horizontally disposed through an off-centered annular path to cause the crank pins thereof to rotate on a fixed horizontal axis; longitudinally and laterally movable means; a support for rotatably engaging one of the main journals of said crankshaft; a vertically movable member to which said support is connected; fluid actuated means operatively associated with said movable member to cause vertical movement thereof, said fluid actuated means being supported from said movable means; tubular means for supplying fluid under a substantially constant pressure to said fluid actuated means to cause said support to be urged upwardly with sufficient force to bear substantially the entire weight of said crankshaft; a hydraulic cylinder in communication with said tubular means; a piston slidably movable in said cylinder; a weight removably connected to said piston, with said weight causing said piston to exert a substantially constant pressure on said fluid; and means that laterally reciprocate said longitudinally movable means in synchronism with the rotation of said crankshaft to at all times urge said support upwardly in a substantially vertical direction.

6. The method of forming a true cylindrical surface on a portion of a deformable member which is eccentrically located with respect to another portion thereof and which comprises: disposing said member in a horizontal position between means for rotating said member at a desired speed and to which means said member is removably attached and also disposing said member in such a manner as to position the part to be formed, coaxially with the said means for rotating said member, positioning at least one vertically and laterally movable rotatable support under a portion of said member which is eccentric to the axis of the part that is to be formed, applying a constant upward force to said support of such magnitude that said member is maintained in a non-deformed position when stationary, moving said support as said member rotates to at all times keep said support in contact therewith and maintain said upward force at said magnitude, generating said upward force by fluid under pressure from a closed circuit in which said fluid is at all times maintained at a constant pressure, and forming said cylindrical surface as said member rotates.

7. The method set forth in claim 6 wherein said upward force is generated by introducing the fluid under pressure into a confined space of variable volume.

8. The method set forth in claim 6 wherein the deformable member is rotatably balanced and wherein said upward force is generated by fluid under pressure in a first confined space of variable volume and wherein said fluid is supplied to said first confined space from a second confined space of variable volume.

9. The method of grinding a crank pin to a true cylindrical shape on a rotatably balanced crankshaft that sags when supported only at the ends which comprises: disposing said crankshaft in a horizontal position between guide means for eccentrically rotating the ends thereof through an annular path having a radius that is one-half the throw of the crank pins of said crankshaft and to which means said crankshaft is removably attached; disposing at least one vertically and laterally movable support under a main bearing of said crankshaft; applying an upward vertically directed force to said support of such constant magnitude that said support bears substantially the entire weight of said crankshaft and floats it in mid-air in a non-deformed and rotatably balanced condition as it is rotated by said guide means; so moving said support during said crankshaft rotation that said support is at all times in contact therewith and said vertically directed force exerted thereon, generating said upward force by fluid under pressure from a closed hydraulic circuit of variable volume in which said fluid is at all times maintained at a constant pressure, and grinding said crank pins as said crankshaft rotates.

10. The method set forth in claim 9 wherein at least a portion of the crank pins of said crankshaft are coaxially positioned with respect to the means for rotating said guide means, and said crankshaft is floated in mid-air in a non-deformed and rotatably balanced condition as it rotates.

11. The method set forth in claim 9 wherein said support is concurrently reciprocated with the rotation of said crankshaft, such reciprocation being at right angles to the axis of the said crankshaft.

12. The method set forth in claim 9 wherein said upward force is generated by fluid under pressure in a first confined space of variable volume and where said fluid is supplied to said first confined space from a second confined space of variable volume.

13. The method set forth in claim 9 wherein said crankshaft is engaged at its ends by two aligned chucks mounted on a head stock and a tail stock and wherein said chucks rotate said crankshaft in a closed circular path and during which rotation said crank pin is rotated about a stationary horizontal axis to permit formation of a true cylindrical surface thereon.

14. The method set forth in claim 9 wherein said crankshaft has a plurality of main bearings and crank pins and wherein a plurality of said supports engage said plurality of main bearings in such manner that said main bearings are disposed in horizontally aligned positions.

References Cited in the file of this patent

UNITED STATES PATENTS

| 656,903 | Morgan | Aug. 28, 1900 |
| 859,513 | Paige | July 9, 1907 |
| 1,700,721 | Groene | Jan. 29, 1929 |
| 1,875,486 | Peaslee | Sept. 6, 1932 |
| 1,961,091 | Smith | May 29, 1934 |
| 2,067,923 | Hudson | Jan. 19, 1937 |
| 2,188,364 | Lannen | Jan. 30, 1940 |
| 2,245,922 | Johnson | June 17, 1941 |

FOREIGN PATENTS

| 567,711 | Germany | Jan. 7, 1933 |

OTHER REFERENCES

Publication: "American Machinist," March 17, 1904, page 358.